US005935495A

United States Patent [19]

Turner et al.

[11] Patent Number: 5,935,495

[45] Date of Patent: Aug. 10, 1999

[54] WARE FORMING METHOD

[75] Inventors: John Barrie Turner, Endon; Robert Norman Deakin, Mount Pleasant; John Michael Victor Burnett, Wettenhall; Dennis Podmore, Newcastle, all of United Kingdom

[73] Assignee: British Ceramic Research Limited, Staffordshire, United Kingdom

[21] Appl. No.: 08/930,293

[22] PCT Filed: Apr. 2, 1996

[86] PCT No.: PCT/GB96/00775

§ 371 Date: Oct. 3, 1997

§ 102(e) Date: Oct. 3, 1997

[87] PCT Pub. No.: WO96/31328

PCT Pub. Date: Oct. 10, 1996

[30] Foreign Application Priority Data

Apr. 4, 1995 [GB] United Kingdom .................. 9506940

[51] Int. Cl.[6] .................................................. C04B 33/00

[52] U.S. Cl. ......................... 264/40.3; 264/571; 264/299; 264/334; 264/335

[58] Field of Search .................................... 264/500, 571, 264/335, 334, 299, 40.3

[56] References Cited

U.S. PATENT DOCUMENTS

| | | | |
|---|---|---|---|
| 2,584,109 | 2/1952 | Blackburn et al. . | |
| 2,584,110 | 2/1952 | Blackburn et al. . | |
| 2,632,227 | 3/1953 | Steele et al. . | |
| 4,413,966 | 11/1983 | Mills et al. ............................ | 264/335 |

FOREIGN PATENT DOCUMENTS

| | | |
|---|---|---|
| 0 204 683 A3 | 12/1986 | European Pat. Off. . |
| 0 567 339 A1 | 10/1993 | European Pat. Off. . |
| 1 806 959 | 6/1970 | Germany . |
| 2 011 909 | 11/1971 | Germany . |
| 2 016 362 | 9/1979 | United Kingdom . |

*Primary Examiner*—James Derrington
*Attorney, Agent, or Firm*—Adams Law Firm, P.A.

[57] ABSTRACT

A method of removing a piece of shaped clay from a mold. The method comprising locating a former against the shaped clay on the opposite side thereof to the mold, with the former being shaped to correspond substantially to the shape of the clay to provide a close fit thereagainst. Fluid such as air is blown through the mold to blow the shaped clay thereof and on to the former.

19 Claims, 1 Drawing Sheet

WARE FORMING METHOD

Figure 1:
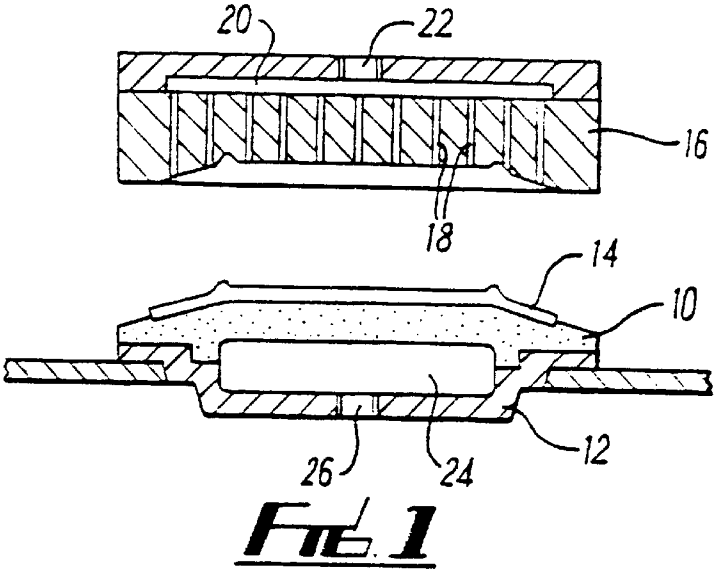

This application is a national stage application, according to Chapter II of the Patent Cooperation Treaty. This application claims the priority date of Apr. 4, 1995, U.K. Patent No. 9506940.7.

This invention concerns a ware forming method and apparatus, and particularly but not exclusively a method and apparatus for removing a piece of shaped clay from a mould.

Conventionally holloware and flatware have been shaped on a roller machine. With such a machine a plaster of paris mould is loaded onto the machine. Typically the mould is held in a metal mould carrier. A piece of clay is placed onto the mould which is then spun and a counter-rotating shaped roller head is brought into contact with the clay to provide the required shape. The ware carrying mould is then removed from the machine and placed in a drier to obtain mould release. Disadvantages are encountered with this system in that, as the shaped clay is held in the moulds during drying a large number of moulds are required which thus occupy a relatively large area in a production area.

According to the present invention there is provided a method of forming clay ware, the method comprising locating a piece of clay on a mould, shaping the clay on the mould, locating a former against the shaped clay on the opposite side thereof to the mould, the former being shaped to correspond substantially to the shape of the clay so as to provide a close fit thereagainst, and blowing a fluid through the mould to blow the shaped clay off the mould and onto the former.

The clay is preferably shaped by a roller head.

The invention also provides a method of removing a piece of shaped clay from a mould, the method comprising locating a former against the shaped clay on the opposite side thereof to the mould, the former being shaped to correspond substantially to the shape of the clay so as to provide a close fit thereagainst, and blowing a fluid through the mould to blow the shaped clay off the mould and onto the former.

The fluid preferably comprises air, and the air may be warmed.

A resistive force is preferably applied to the former against the clay, said resistive force being slightly less than the force applied by the fluid being blown through the mould.

The resistive force may be applied by a pneumatic cylinder, or a resilient member such as a spring.

Suction may be applied through the former to hold the shaped clay thereagainst following removal from the mould.

Air, which may be warmed, is preferably blown through the mould following removal of the shaped clay, to condition the mould.

First detection means may be provided for sensing when the shaped clay has been blown off the mould, and said means may comprise second detection means for sensing a reduction in the back pressure in the mould. The first detection means may be connected to means for automatically separating the mould and former when the shaped clay has moved onto the latter.

The mould may be rotated relative to the former once fluid is being blown through the mould, whereby to shear the water film between the mould and the clay.

The mould may be made of an acrylic plastics material and preferably an acrylic bead. The plastics material is preferably mounted on a carrier. The carrier may be made of a plastics material such as acrylic, or of metal. Alternatively the mould may be made of plaster of paris.

According to the present invention there is further provided a former usable in a method according to any of the preceding eleven paragraphs.

Openings are preferably provided through the former to permit the article of clay to be held thereon by suction.

Figure 2:
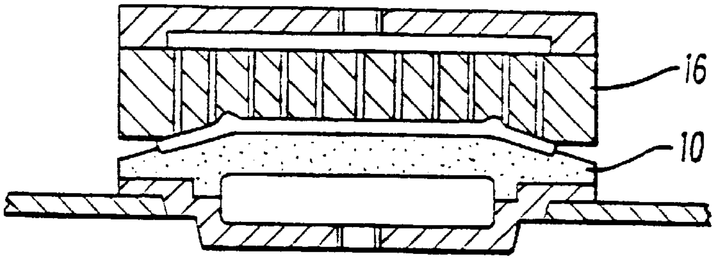
Figure 3:
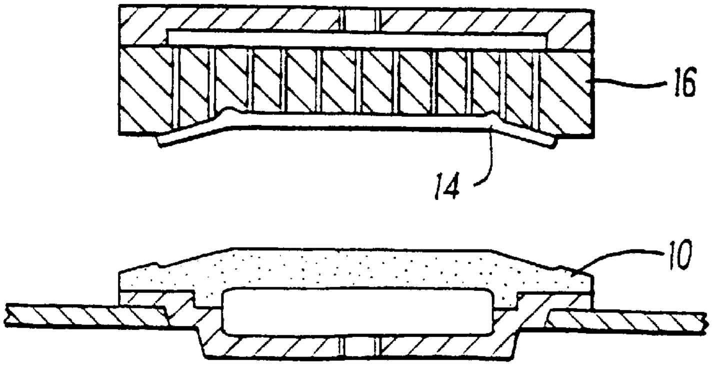

An embodiment of the present invention will now be described by way of example only, with reference to FIGS. 1–3 of the accompanying drawings which show sequential stages of a method according to the present invention using apparatus according to the present invention.

The drawings show apparatus for removing an item of the shaped clay from a mould. The clay is in the form of an item of flatware such as a plate. The drawings show a permeable synthetic mould 10. The mould 10 is made from an acrylic bead and has an upper surface shaped to correspond to the upper surface of a plate. The mould 10 is mounted on a carrier 12 also made of acrylic.

In a method according to the present invention, a piece of clay is located on the mould 10. The mould 10 is subsequently spun and a roller head (not shown) is used to form the piece of clay into a required shape 14. A former 16 is lowered onto the clay 14. The former 16 has a lower face as shown in the drawings, with a shape corresponding to the rear profile of the clay 14 such that the former 16 provides a close fit thereagainst. A downward force is then applied to the former 16 whilst suction is provided therethrough. Simultaneously air is blown through the mould 10 towards the clay 14.

A plurality of passages 18 extend through the former 16 and connect with a chamber 20 which has an outlet 22 connectable to a suction pump or other source of reduced pressure. A chamber 24 is provided beneath the mould 10, between the mould 10 and the carrier 12 with an inlet 26 connectible to a source of above atmospheric pressure.

The force applied to the former 16 is arranged to be slightly less than that applied to the clay 14 by air being blown through the mould 10. The force may be applied by a pneumatic cylinder or a resilient member.

Once the clay 14 has been blown off the mould 10 by air passing therethrough, which air may be warmed, the mould 10 and former 16 can be separated with the clay 14 being held on the latter by the suction through the passages 18. The former 16 can then be turned over with the shaped clay 14 thereon to dry. As the clay is not on the mould to which it may have become attached, and as the former may be made of a more heat resistant material than plaster of paris, the clay can be dried very quickly. Warm air may be blown through the empty mould 10 to condition same by removing any moisture or other materials.

It has been found to be advantageous to rotate the mould, usually a partial turn, relative to the former whilst air is being blown through the mould. This rotation shears the water film between the mould and the clay.

There is thus described a method and apparatus which provide considerable advantages over existing arrangements. As the former holds the clay 14 against the mould 10 as the clay 14 is blown thereoff, this prevents distortion of the clay 14. Furthermore, this “sandwiching” arrangement prevents air passing through the mould 10 and lifting for example an edge of the clay 14 to provide a ready escape thereby preventing further release action. Such an occurance would provide for uneven removal of the clay 14 from the mould 10 and probably also distortion of the clay 14. As a result of this “sandwiching” the air tends to form a “wedge” between the clay and the mould forcing the whole of the clay 14 off the mould substantially at once to provide even release. As the clay is removed rapidly from the relatively expensive mould following forming, there is not the requirement to use a large number of moulds. Accordingly, a number of the above mentioned disadvantages are overcome. Furthermore, this system lends itself to short runs of different shaped articles.

Various modifications may be made without departing from the scope of the invention. For example, the former may be positioned with its shaped face pointing upwards such that the mould carrying shaped clay is lowered onto the former. In such an instance, suction is not required through the former to hold the clay thereon. Whilst the above described example uses an acrylic mould the invention is also readily applicable to plaster of paris moulds, or moulds made from any suitable permeable material.

The method can be used with different items of ware and different forming techniques. The method and apparatus readily lend themselves to automatic operation which could be arranged to provide a required mould and corresponding former as programmed by an operator. Means may be provided to indicate when the clay has been blown off the mould onto the former, perhaps by detecting a drop in back pressure in the mould. Said indication means may be connected to means for automatically separating the former and mould once this 'blowing off' has taken place.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. A method of forming clay ware, the method comprising locating a piece of clay on a mould, shaping the clay on the mould, locating a former against the shaped clay on the opposite side thereof to the mould, the former being shaped to correspond substantially to the shape of the clay so as to provide a close fit thereagainst, and blowing a fluid through the mould to blow the shaped clay off the mould and onto the former, characterised in that a resistive force is applied by means of a pneumatic cylinder or resilient member to the former against the clay, said resistive force being slightly less than the force applied by the fluid being blown through the mould.

2. A method according to claim 1, characterised in that the clay is shaped by a roller head.

3. A method of removing a piece of shaped clay from a mould, the method comprising locating a former against the shaped clay on the opposite side thereof to the mould, the former being shaped to correspond substantially to the shape of the day so as to provide a close fit thereagainst, and blowing a fluid through the mould to blow the shaped clay off the mould and onto the former, characterised in that a resistive force is applied by means of a pneumatic cylinder or resilient member to the former against the day, said resistive force being slightly less than the force applied by the fluid being blown through the mould.

4. A method according to claims 1 or 3, characterised in that the fluid comprises air.

5. A method according to claim 4, characterised in that the air is warmed.

6. A method according to claims 1 or 3, characterised in that the resistive force is applied by a spring.

7. A method according to claims 1 or 3, characterised in that suction is applied through the former to hold the shaped clay thereagainst following removal from the mould.

8. A method according to claims 1 or 3, characterised in that air is blown through the mould following removal of the shaped clay, to condition the mould.

9. A method according to claim 8, characterised in that the air is warmed.

10. A method according to claims 1 or 3, characterised in that first detection means is provided for sensing when the shaped day has been blown off the mould.

11. A method according to claim 10, characterised in that the first detection means comprises second detection means for sensing a reduction in the back pressure in the mould.

12. A method according to claim 10, characterised in that the first detection means is connected to means for automatically separating the mould and former when the shaped day has moved onto the former.

13. A method according to claims 1 or 3, characterised in that the mould is rotated relative to the former once fluid is being blown through the mould, whereby to shear a water film between the mould and the clay.

14. A method according to claims 1 or 3, characterised in that the mould is made of an acrylic plastics material.

15. A method according to claim 14, characterised in that the mould is made of an acrylic bead.

16. A method according to claim 14, characterised in that the plastics material is mounted on a carrier.

17. A method according to claim 16, characterised in that the carrier is made of a plastics material.

18. A method according to claim 16, characterised in that the carrier is made of metal.

19. A method according to claims 1 or 3, characterised in that the mould is made of plaster of paris.

* * * * *